US008886119B2

(12) United States Patent
Posch et al.

(10) Patent No.: US 8,886,119 B2
(45) Date of Patent: Nov. 11, 2014

(54) COORDINATING MULTIPLE CONTACTLESS DATA CARRIERS

(75) Inventors: Martin Posch, Graz (AT); Bernhard Spiess, Graz (AT); Juergen Schroeder, Graz (AT)

(73) Assignee: NXP B.V., Eindhoven (NL)

( * ) Notice: Subject to any disclaimer, the term of this patent is extended or adjusted under 35 U.S.C. 154(b) by 557 days.

(21) Appl. No.: 13/019,861

(22) Filed: Feb. 2, 2011

(65) Prior Publication Data
US 2012/0196531 A1 Aug. 2, 2012

(51) Int. Cl.
*H04B 5/00* (2006.01)

(52) U.S. Cl.
CPC ............ *H04B 5/0062* (2013.01); *H04B 5/0068* (2013.01)
USPC ........................................................ 455/41.1

(58) Field of Classification Search
USPC ....................... 455/41.1, 41.2; 340/10.1–10.6, 340/572.1–572.9; 235/375–385
See application file for complete search history.

(56) References Cited

U.S. PATENT DOCUMENTS

| 7,519,326 | B2 * | 4/2009 | Thomas et al. ............. 455/41.2 |
| 8,022,886 | B2 | 9/2011 | Kai et al. |
| 8,742,899 | B2 | 6/2014 | Smith |
| 2009/0322491 | A1 * | 12/2009 | Wood, Jr. ..................... 340/10.4 |
| 2010/0207739 | A1 * | 8/2010 | Smith et al. .................. 340/10.4 |
| 2011/0103312 | A1 * | 5/2011 | Mickle et al. ................. 370/328 |
| 2012/0134681 | A1 * | 5/2012 | Hamana et al. ............... 398/141 |
| 2012/0135681 | A1 * | 5/2012 | Adams et al. ................ 455/41.1 |
| 2012/0178366 | A1 * | 7/2012 | Levy et al. ................... 455/41.1 |

FOREIGN PATENT DOCUMENTS

| CN | 1875371 A | 12/2006 |
| CN | 101303747 A | 11/2008 |
| CN | 101685489 A | 3/2010 |

OTHER PUBLICATIONS

Atmel Corporation. "Requirements of ISO/IEC 14443 Type B Proximity Contactless Identification Cards." ISO/IEC 14443/RFID Nov. 2005, 28 pgs.
NXP Semiconductors. "P5Cx012/02x/40/73/80/144 family. Secure dual interface and contact PKI smart card controller." Nov. 24, 2008, 18 pgs.
NXP Semiconductors. "The world's first 'smart' car key prototype." Press Release, Eindhoven, Oct. 21, 2008, 4 pgs.
Foreign counterpart patent appl. No. CN201210021540.9 correspondence (Sep. 3, 2014).

* cited by examiner

*Primary Examiner* — Ankur Jain (57) ABSTRACT

A contactless transponder device is provided with multiple ICs. A first IC includes a first contactless transponder interface circuit configured and arranged to respond to a contactless field by providing a first identifier of the first IC. A second IC includes a second contactless transponder interface circuit configured and arranged to respond to the contactless field by providing a second identifier of the second IC. A controller is configured and arranged to inhibit the first IC from responding to the contactless field.

18 Claims, 4 Drawing Sheets

COORDINATING MULTIPLE CONTACTLESS DATA CARRIERS

The contactless technology, sometimes referred to as radio frequency identification or "RFID," has the potential to be used in numerous areas of people's everyday activities. In certain implementations, contactless transponders (sometimes referred to as RFID tags) include circuitry located on an integrated circuit. This integrated circuit includes control logic that can be connected to an antenna for wirelessly communicating with an external reader. Some contactless transponders are considered passive because they are powered by an electromagnetic field generated by the external reader. Accordingly, the passive contactless transponders do not require an internal energy source to communicate the data. Other contactless transponders are considered active because they use an internal energy source to provide transmission functionality.

Any number of different applications can benefit from the use of contactless transponders. A few additional, non-limiting, examples include personal identification (e.g., driver's license or passport), transportation services (e.g., public transportation) and asset tracking (e.g., supply chain management).

The functionality provided by contactless transponders can vary depending upon the desired application. For instance, some contactless transponders operate as read-only devices that allow an external reader to retrieve stored data. These read-only devices, however, lack the ability to receive data and store data from an external reader. Other contactless transponders provide both read and write functionalities. Some applications require that the contactless transponders provide enhanced security functions. These functions can include authentication, encryption and tamper-proofing of data that is stored or transmitted.

Certain contactless transponders function as automotive keys. Contactless transponders functioning as automotive keys can be used to control and provide access to the automobile. Additional functionality can also be provided in the form of individual preferences (e.g., seat location, mirror placement and/or favorite radio stations). The automobile contains an external reader that detects the contactless transponder and establishes communications therewith.

Other contactless transponders function as payment sources by acting as credit/debit cards. Such contactless transponders can store and communicate data used in performing monetary transactions. For example, an external reader can communicate with the contactless transponder to retrieve stored payment data (e.g., for account identification and/or authentication) and then use the data to authorize a purchase.

Embodiments of the present disclosure are directed toward coordinating the functionality of multiple contactless transponders. In certain embodiments, the contactless transponders can be configured to provide different functions (e.g., automotive and banking/credit/debit).

Consistent with one embodiment of the present disclosure, a contactless transponder device is provided with multiple ICs, which can each be located on a separate chip with respective substrates. A first IC includes a first contactless transponder interface circuit configured and arranged to respond to a contactless field by providing a first identifier of the first IC. A second IC includes a second contactless transponder interface circuit configured and arranged to respond to the contactless field by providing a second identifier of the second IC. A controller is configured and arranged to inhibit the first IC from responding to the contactless field. In some instances, the second IC chip can be configured to respond to the contactless field while the first IC is inhibited.

Consistent with other embodiments of the present disclosure, a method for operating an automotive key device includes receiving a control input. In response to the control input, a first integrated circuit (IC) that includes a first contactless communication interface circuit that is inhibited from responding to a contactless field. Subsequently and in response to a change in the control input, both the first IC and the second IC are allowed to respond to the contactless field by providing respective identifiers. In some instances and also in response to the control input, a second IC that includes a second contactless communication interface circuit is allowed to respond to the contactless field by providing an identifier of the second IC.

Consistent with other embodiments of the present disclosure, a contactless transponder device includes a first integrated circuit (IC). The first IC includes a first contactless transponder interface circuit configured and arranged to respond to a contactless field by providing a first identifier of the first IC. A second IC includes a second contactless transponder interface circuit configured and arranged to respond to the contactless field by providing a second identifier of the second IC. A controller is configured and arranged to determine, in response to and a first received communication request, that a previous state of the first IC allowed the first IC to respond using near-field wireless communications in response to the determination, inhibit, the first IC from responding to the contactless field using near-field wireless communications and allow, in response to and a second received communication request, the first IC to respond using near-field wireless communications. In some instances, the controller is configured and arranged to allow the second IC to respond using near-field wireless communications while the first IC is inhibited.

The above discussion is not intended to describe each embodiment or every implementation. The figures and following description also explicitly describe various embodiments and other embodiments, modifications, equivalents, and alternatives fall within the spirit and scope of the disclosure.

Various example embodiments may be more completely understood in consideration of the following detailed description in connection with the accompanying drawings, in which.

While the disclosure is amenable to various modifications and alternative forms, examples thereof have been shown by way of example in the drawings and will be described in detail. It should be understood, however, that the intention is not to limit the disclosure to the particular embodiments shown and/or described. On the contrary, the intention is to cover all modifications, equivalents, and alternatives falling within the spirit and scope of the disclosure.

The disclosed embodiments are believed to be applicable to a variety of different types of processes, devices, and arrangements for use with various contactless transponders. While the embodiments are not necessarily so limited, various aspects of the disclosure may be appreciated through a discussion of examples using this context.

Embodiments of the present disclosure are directed toward coordinating multiple contactless transponders for use with different applications, wherein for least one of the applications, an associated external reader does not handle collisions between multiple contactless transponders. Although not necessarily limited thereto, contactless transponder applications that involve credit/debit card functions can use readers that prohibit collision handling (e.g., according to protocols defining how collisions are handled). Accordingly, aspects of the present disclosure are directed toward coordinating the communications of multiple contactless transponders to allow for communication with an external reader that does not handle collisions between contactless transponders.

Collisions between contactless transponders can occur after the contactless transponders detect the presence of an external reader. If multiple contactless transponders detect the presence of an external reader, they might all attempt to communicate with the external reader at the same time. The simultaneous communication attempts can corrupt the transmitted data and thereby result in a collision. Some external readers are configured to handle collisions by implementing a protocol to initialize multiple transponders for sequential communications. If, however, the external reader does not allow for collision handling, then the presence of two contactless transponders prohibits communications. Accordingly, embodiments of the present disclosure are directed toward a multiple contactless transponders device that allows the multiple contactless transponders to communicate with such an external reader. For instance, the multiple contactless transponders device can disable one or more contactless transponders to allow another contactless transponder to communicate with an external reader that does not handle collisions.

Various embodiments are directed toward a contactless transponder device that operates using near-field wireless communications. An external reader generates a magnetic field that can be used to power a contactless transponder device. An antenna coupled to a rectifier circuit can be used to generate a stable voltage from the magnetic field. This voltage can then be used to power various logic circuits. The contactless transponder can then receive data by detecting modulations of the magnetic field and communicate data by introducing modulations to the magnetic field.

Certain embodiments of the present disclosure are directed toward contactless transponders and systems that are configured to use portions and/or variations of the ISO/IEC 14443 international standard for contactless transponders. When a device enters a contactless ISO/IEC 14443 field, the ICs simultaneously respond with their unique identifier number (e.g., IC1 with UID1 and IC2 with UID2). When two ICs respond at the same time, a collision is detected by the external reader. This collision can be resolved by an anti-collision sequence, examples of which are specified in ISO/IEC 14443. Contactless readers with this anti-collision capability can thus select each data carrier in sequence in order to store or retrieve data from the respective data carrier. However, due to security restrictions, contactless ISO/IEC 14443 readers for payment (e.g., credit/debit card) functions do not allow for there to be more than one data carrier in the field at the same time. For more details on contactless transponder integrated circuit chips, reference can be made to the *P5Cx012/02x/40/73/80/144 family, Secure dual interface and contact PKI smart card controller, Rev. 03-24 Jan. 2008, Objective short data sheet*, which is fully incorporated herein by reference.

Particular embodiments of the present disclosure are directed toward a multiple-purpose device that includes at least two contactless transponders, one of which functions as an automotive key and the other of which functions as a credit/debit card. In certain instances, the multiple-purpose device is configured to disable the automotive contactless transponder to allow the credit/debit contactless transponder to communicate with an external reader that does not handle collisions between contactless transponders.

Embodiments of the present disclosure are directed toward multiple integrated circuit (IC) chips, each IC chip configured with a corresponding contactless transponder, such as an ISO/IEC 14443 compatible interface circuit. A first IC chip (IC1) stores data for a first application (e.g., an automobile key), which allows for external readers to handle collisions between contactless transponders. A second IC chip (IC2) stores data for a second application (e.g., a credit/debit card function), which does not allow for external readers to handle collisions between contactless transponders. IC1 is configured to respond to a control input by temporarily disabling/enabling its communication capabilities. This allows IC2 to communicate with an external reader that does not handle collisions between contactless transponders. The control input can be provided by one or more input sources, as discussed in more detail herein.

Consistent with one embodiment of the present disclosure, the control input is configured so that IC1 alternates between enable and disable states. One mechanism for generating such a control input involves the storage of information regarding the previous enable/disable state in a memory storage device/circuit. The stored value is updated and the system is designed such that enable/disable state of IC1 is different from the previous enable/disable state. Thus, the control input is used to toggle IC1 between enable and disable states.

Consistent with embodiments of the present disclosure, memory storage devices/circuits can be either volatile or nonvolatile. Nonvolatile memories allow for information to be stored in the absence of a power supply. Volatile memories lose stored data when power is removed. This can be particularly useful for devices that do not have a (reliable) internal power supply. For instance, internal power supplies can consume extra space and/or add to the cost of a device. Thus for some applications (e.g., automotive keyfobs), an internal power supply is not used or is limited in terms of its expected life.

Aspects of the present disclosure recognized that, the nonvolatile memory storage devices, such as flash devices, have a limited number of writes (e.g., flash program-erase cycles) before failure of the memory. Accordingly, embodiments of the present disclosure are directed toward reducing the number of writes and/or providing alternative mechanisms for providing the control input.

Consistent with one embodiment of the present disclosure, a multiple contactless transponders device can be configured to use both a volatile memory device and a nonvolatile memory device. During normal operation, an internal power supply (e.g., a battery) can provide power to the volatile memory device. The information regarding the previous enable/disable state can be stored in the volatile memory device and maintained using the internal power supply. In this manner, the multiple contactless transponders device does not write to the nonvolatile memory so long as the internal power supply is not depleted. In certain embodiments, an internal power supply monitor can detect when the internal power supply is depleted and then indicate that the volatile memory device is no longer capable of storing information in the absence of external power (e.g., from an external reader).

Accordingly, multiple contactless transponders device can begin storing the information regarding the previous enable/disable state in the nonvolatile memory. Should the internal power supply subsequently be determined to have sufficient power (e.g., a battery is replaced), the multiple contactless transponders device can resume storing the information in the volatile memory device.

Consistent with certain embodiments of the present disclosure, a manual input can be used in determining the value of the control input. This manual input can be, for example, a switch or a button that can be activated by a holder of the contactless transponder device. The contactless transponder device can respond to the manual input by placing the IC1 in the disable states. Thus, a holder of the contactless transponder device can activate a switch when placing the contactless transponder device near an external reader that does not handle collisions (e.g., a credit card reader). According to some embodiments of the present disclosure, the manual input can be used in connection with either (or both) of the nonvolatile and volatile memory devices. For instance, the manual input can function as an override to the alternating enable/disable states related to the storage of the previous enable/disable state.

In another embodiment of the present disclosure, the manual input can be used together with the memory to control the behavior. For example, a controller circuit can respond to a manual input to disable IC1 until the button is pressed for a second time. Alternatively, even two buttons (one enable and one disable button) could be used as well.

Embodiments of the present disclosure are directed toward the use of a random number generator for determining the value of the control input. When the contactless transponder device first detects a reader, a random number can be generated. This random number can then be used to ensure that IC1 is sometimes enabled and sometimes disabled. According to some embodiments of the present disclosure, the manual input can be used in connection with one or more of the nonvolatile and volatile memory devices.

A particular embodiment of the present disclosure is directed toward a contactless transponder device that includes a first integrated circuit chip (IC1) for an automotive key function and second integrated circuit chip (IC2) for a credit/debit card function. IC1 can store (and provide access to) information pertaining to a user's automotive preferences. IC2 can store (and provide access to) information pertaining to a user's payment information. The credit/debit card function includes significant safeguards to protect data stored on IC2. Each of the IC chips can be independent from the other, including a lack of common memory or other communication interface circuit. This can be particularly useful for maintaining the security of each IC independent from one another. For instance, IC2 can be configured to provide high levels of security (e.g., authentication, encryption and/or tamper detection) per the sensitive nature of the credit/debit card functions. IC1 can be configured with a different (e.g., lower) security per the nature of the automotive functions and associated data, such as driver preferences.

According to various embodiments of the present disclosure, IC1 can communicate in different ways with an automobile. For instance, IC1 can use a contactless interface circuit that uses a protocol other than ISO14443 (e.g., 125 kHz contactless interface circuit for immobilization, which can be proprietary) and/or an UHF link (unidirectional or bidirectional). Moreover, IC1 can be configured to communicate with readers other than a automobile. For instance, a automobile owner can store individual preferences with a standardized contactless ISO14443 reader and his personal computer or handheld device. When entering the car, immobilizer data and user preferences are interchanged via the (e.g., proprietary) 125 kHz link between the key and the car.

In certain implementations, the separate ICs can be manufactured and/or programmed independently. For instance, the programming of the credit/debit data can be carried out at a first location by a first part and the programming of the automotive data can be carried out at a second location. Moreover, aspects of the present disclosure can be useful for allowing the IC2 to be changed, updated or replaced by a different type of IC without the need to modify the IC1. In other embodiments, the contactless transponder device can be configured to allow IC1 and IC2 to be physically detached from one another.

Figure 1:
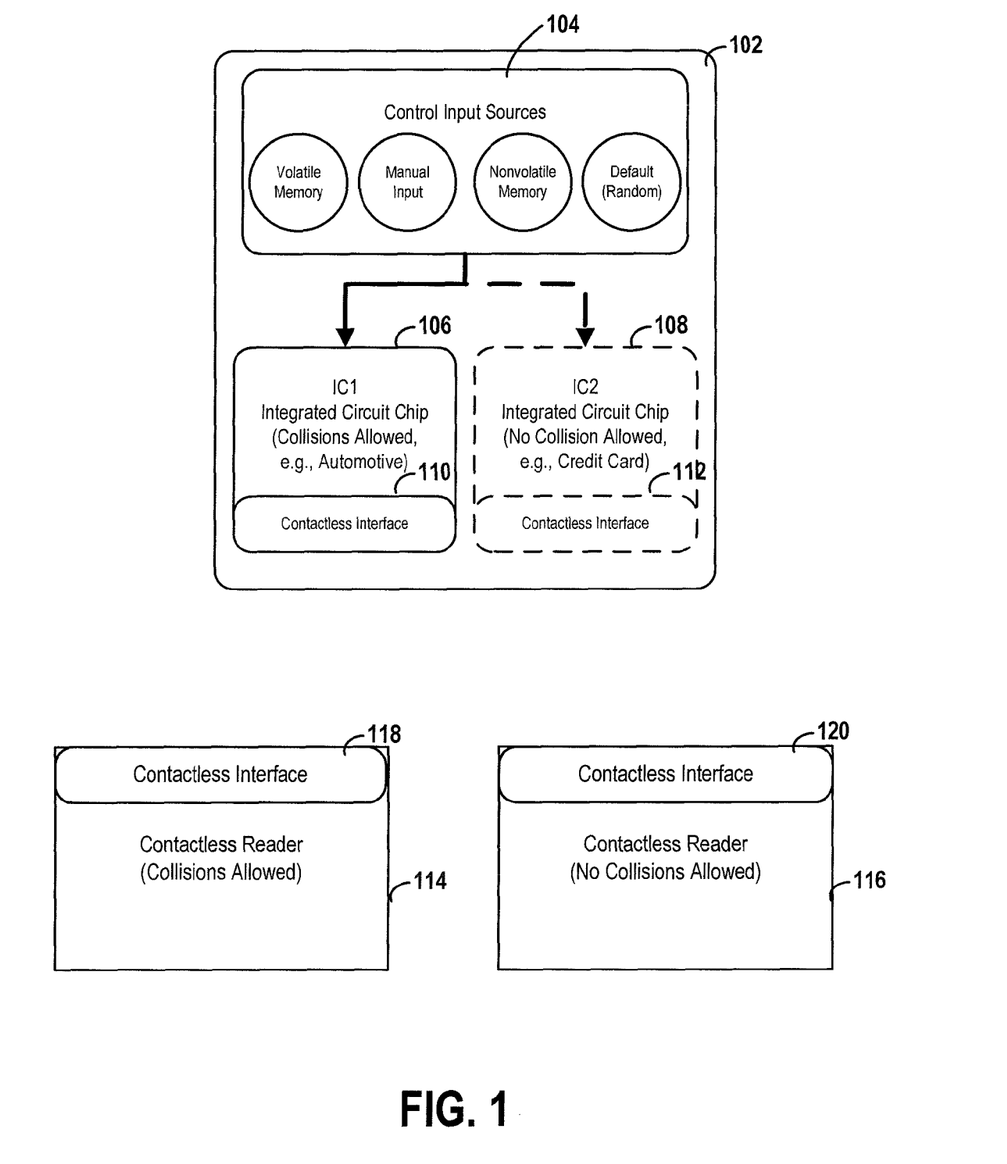
FIG. 1 depicts a system diagram of a contactless transponder device that is designed to interface with external readers, consistent with an embodiment of the present disclosure.

Turning now to the figures, FIG. 1 depicts a system diagram of a contactless transponder device that is designed to interface with external readers, consistent with an embodiment of the present disclosure. Contactless transponder device 102 is configured to communicate with external readers 114, 116. External readers 114, 116 are configured to produce a magnetic communication field using contactless interface circuits 118, 120. In addition to its use in connection with data communications, this magnetic communication field can be used by contactless transponder device 102 to provide power. External reader 114 is configured to handle collisions between multiple contactless transponders, whereas external reader 116 does not handle collisions.

Contactless transponder device 102 includes a first integrated circuit chip (IC1) 106. IC1 includes a contactless interface circuit 110. In addition to processing logic, contactless interface circuit 110 can include circuit components such as an antenna, a filter circuit and/or a rectifier circuits for providing power from a received magnetic communication field.

A control input, responsive to control input sources 104, is provided to IC1 in response to control input sources 104. Examples of control input sources 104 include volatile memory, nonvolatile memory, manual input and a random input. IC1 determines whether or not to enable contactless interface circuit 110 based upon the control input. The control input sources 104 can be internal or external to IC1. For instance, the memory storage device and/or random number generated can be designed into the circuitry of IC1. According to other embodiments, the one or more control inputs can be generated external to IC1. For instance, an external user switch can be linked to an input of IC1. Combinations thereof are also possible.

Contactless transponder device 102 also includes a second integrated circuit chip (IC2) 108. IC2 includes a contactless interface circuit 112. Contactless interface circuit 112 can include circuit components such as an antenna, a filter circuit and/or a rectifier circuits for providing power from a received magnetic communication field.

Consistent with embodiments of the present disclosure, IC2 can be configured to always respond to a contactless reader. In this manner, contactless transponder device 102 responds to a contactless reader by allowing a response from either both IC1 and IC2 (requiring collision handling) or just with IC2.

Consistent with other embodiments of the present disclosure, IC2 can respond to the control input in a manner opposite of IC1. Thus, contactless transponder device 102 responds to contactless reader with either IC1 or IC2, but not both.

The control inputs can be used individual or in combination as determined by a controller circuit. In some embodiments the controller circuit can be located within IC1 however, certain implementations allow for some or all of the controller circuit to reside externally to IC1. Consistent with one embodiment of the present disclosure, the control inputs are implemented in a tiered manner according to a predetermined preference. For instance, the first preference might be to use a manual input as the determining factor. Thus, irrespective of the other inputs, selection of the manual input can disable IC1 (e.g., by disabling a transponder interface circuit thereof). A second preference may be the volatile memory. Thus, if the power supply is still sufficient, the volatile memory can be used. This can be particularly useful for reducing the number of write cycles to the nonvolatile memory. A third preference may be the nonvolatile memory. The nonvolatile memory would therefore only be used if there is no manual selection and if the volatile memory could not be used (e.g., due to a battery failure). A fourth preference could then be a default (e.g., random) selection mechanism, which is only employed when the other preferences are not available.

Figure 2:
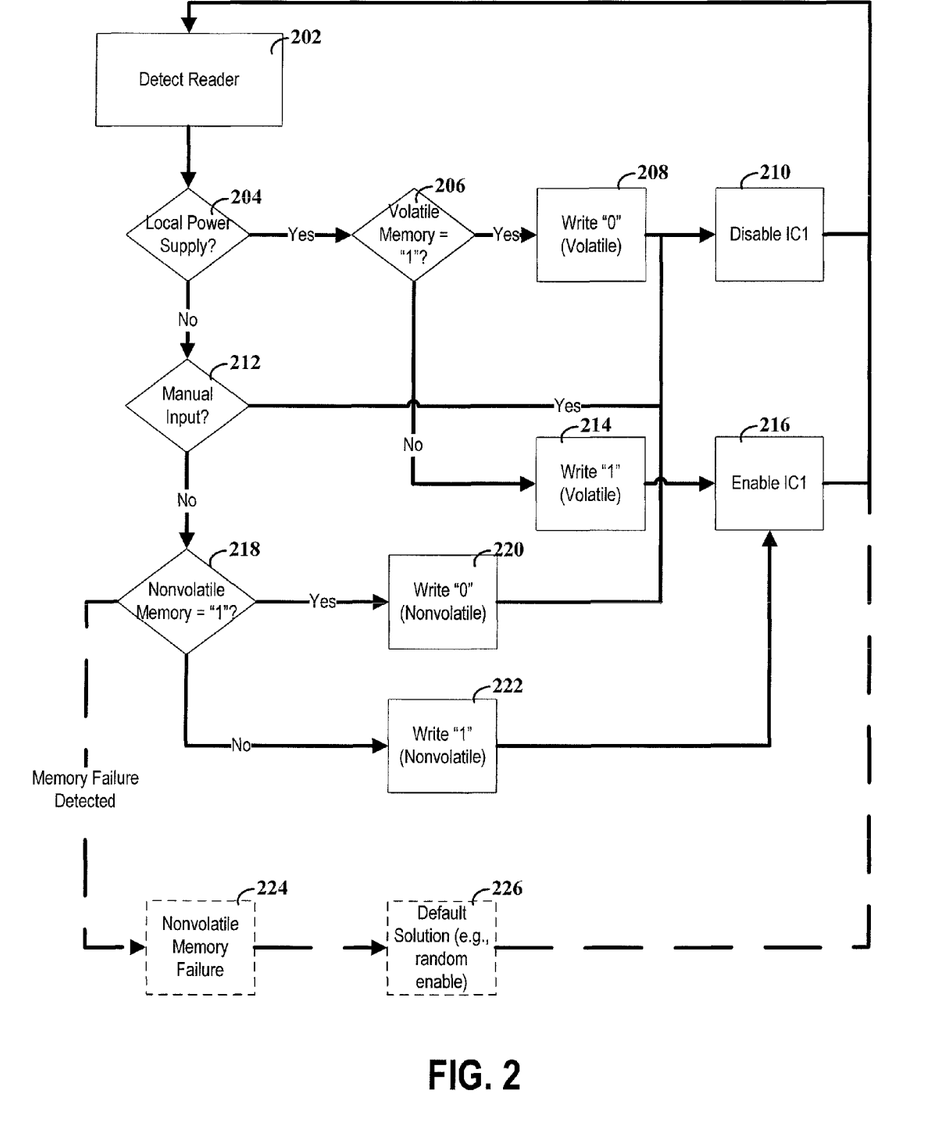
FIG. 2 depicts a flow diagram for use with a tiered control input preference, consistent with an embodiment of the present disclosure.

FIG. 2 depicts a flow diagram for use with a tiered control input preference, consistent with an embodiment of the present disclosure. At 202, an external reader is detected. The detection can be in response to a first introduction to a magnetic field or to a request for response by the external reader. The contactless transponder device, which includes IC1, first determines if the local power supply (e.g., a battery) is sufficient (204). If the contactless transponder device determines that the battery is sufficient, the contactless transponder device then determines the value stored in the volatile memory (206). FIG. 2 depicts this stored value as corresponding to a single bit (i.e., "1") however, the stored value could be represented by more bits and other values. For the purposes of the FIG. 2 flow diagram, it is assumed that a stored value of "1" represents a previously enabled state and that a stored value of "0" represents a previously disabled state.

If the contactless transponder device determines that the previous state was that of being enabled ("1"), the volatile memory is updated by writing a "0" (208). The IC1 is then disabled (210). If the contactless transponder device determines that the previous state was that of being disabled ("0"), the volatile memory is updated by writing a "1" (214). The IC1 is then enabled (216). The process then repeats upon a subsequent detection of a reader. In this manner, IC1 alternates between being enabled and disabled.

If the contactless transponder device determines that the local power supply is insufficient to guarantee the state of volatile memory, the contactless transponder device checks for the presence of a manual input (212). If there is a manual input, contactless transponder device disables IC1. If, however, there is no manual input, the contactless transponder device checks the state of nonvolatile memory (218).

If the contactless transponder device determines that the previous state was that of being enabled ("1"), the nonvolatile memory is updated by writing a "0" (220). The IC1 is then disabled (210). If the contactless transponder device determines that the previous state was that of being disabled ("0"), the nonvolatile memory is updated by writing a "1" (222). The IC1 is then enabled (216). The process then repeats upon a subsequent detection of a reader. In this manner, IC1 alternates between being enabled and disabled.

In an alternative embodiment, the contactless transponder device can also be configured to check for failure of the nonvolatile memory (e.g., due to excessive writes). If the contactless transponder device detects a possible failure (224), a default/random selection can then be used (226). Although a random selection might result in longer delays (e.g., due to IC1 being disabled for consecutive reader detections), the random nature should eventually allow connection to an external reader.

Consistent with various embodiments of the present disclosure, the particular order of the different inputs shown by FIG. 2 can be modified according to a desired preference. For instance, the manual input can be checked before the status of the volatile memory. The manual input can then be used to override any other input.

If the contactless transponder device is relying upon a nonvolatile memory storage device, an undetected failure of the nonvolatile memory can result in the contactless transponder device being stuck with IC1 permanently enabled or disabled. In order to determine whether or not the nonvolatile memory storage device has failed, embodiments of the present disclosure include a memory failure detection circuit. For example, the memory failure detection circuit can use logic to determine the validity of stored data. In this regard, the use of multiple flash bits can be useful for detecting memory failure. For example, the use of parity bits to determine whether or not data has been correctly stored can be useful for detecting the failure of individual memory bits. Once a failure is detected, a default (e.g., random) selection mechanism can be employed.

Figure 3:
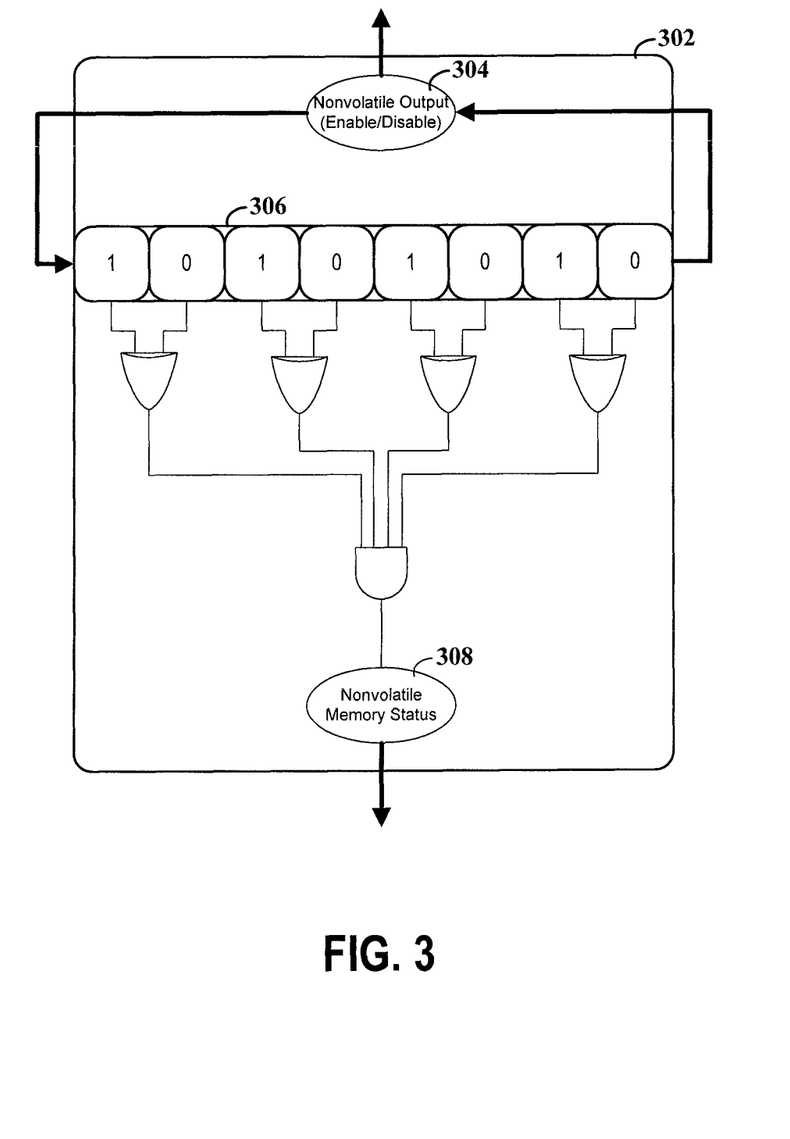
FIG. 3 shows a nonvolatile memory device/circuit, consistent with an embodiment of the present disclosure.

FIG. 3 shows a nonvolatile memory device/circuit, consistent with an embodiment of the present disclosure. Nonvolatile memory device/circuit 302 includes nonvolatile memory storage 306. The nonvolatile memory storage 306 includes multiple bits (although eight bits are shown, other numbers of bits can be used). This is consistent with nonvolatile memory storage devices that are configured to read or write multiple bits in parallel. The output of nonvolatile memory 304 can be used to determine whether or not IC1 is enabled. Functionally, the depicted embodiment operates consistent with a shift register with the output 304 being provided as the input to the shift register. The memory can be initialized by storing a binary data value that has alternating bit values. Thus, the output 304 also alternates in values for each read access (e.g., due to logically shifting of the bits after each read). For instance, the eight bit memory location can be read from an EEPROM memory device. The most significant bit can be used as the output 304. Logic then shifts each bit, with the most significant bit being input as the least significant bit. The resulting value is then written back to the EEPROM memory device. The specific bit values and logic function can be adjusted as desired (e.g., two predetermined values can be used to represent the previous state and any deviation from these values can represents a memory failure).

The nonvolatile memory status 308 is configured to indicate whether one or more bits of the nonvolatile memory storage 306 have failed. In the particular embodiment shown, specialized logic determines whether or not the bits alternate in value. Bits that no longer alternate in value are indicative of an improper memory value and can therefore be used to indicate memory failure.

Figure 4:
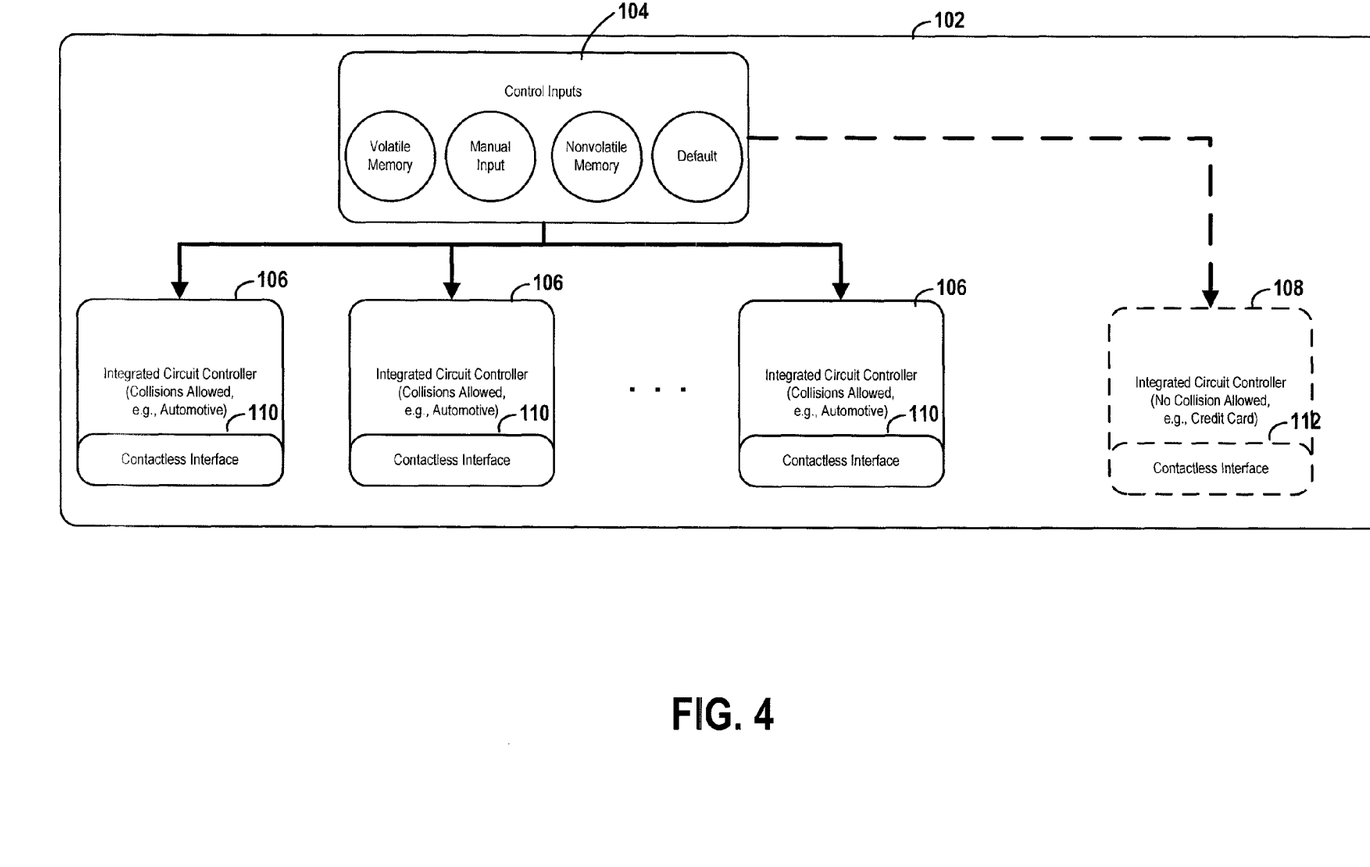
FIG. 4 depicts a system diagram of a contactless transponder device with multiple collision-capable integrated circuit chips designed to interface with external readers, consistent with an embodiment of the present disclosure.

FIG. 4 depicts a system diagram of a contactless transponder device with multiple collision-capable integrated circuit chips designed to interface with external readers, consistent with an embodiment of the present disclosure. As depicted in FIG. 4, there can be multiple integrated circuit chips 106 designed for use with an integrated circuit chip 108 that communicates with an external reader that does not handle collisions. The contactless transponder device is configured to enable/disable integrated circuit chips 106 in unison via a control signal. Accordingly, when enabled, all devices are allowed to communicate with an external reader however, when disabled only the integrated circuit chip 108 is allowed to communicate. In certain embodiments, the components are otherwise consistent with the corresponding discussion of FIG. 1.

Aspects of the present disclosure can be carried out in connection with a circuit-implemented system. The system and its components (e.g., controller or logic circuitry) can include one or more of: discrete logic components, programmable logic arrays, specialized processors or general purpose processors that are specially programmed. Combinations of these and other circuit elements are also possible and within the scope of various embodiments of the present disclosure. For example, systems consistent with the aspects shown in the figures could be implemented in a variety of circuit-based forms, such as through the use of data processing circuit modules. More specifically, such systems are exemplified by implementation in high-speed programmable computer/processor circuits that execute stored instructions to provide operations corresponding to the various blocks of FIG. 1. Alternatively, such a computer/processor could be implemented in combination with discrete and or semi-programmable circuitry (e.g., as Field-Programmable Gate Arrays, Programmable Logic Devices/Arrays). Also various ones of the illustrated blocks, and those functions discussed in text, can be implemented using integrated and nonintegrated approaches, e.g., with certain ones of the blocks located remotely and/or operated disparately relative to the other blocks.

According to certain embodiments of the present disclosure, one or more of the components of IC1 and IC2 can be shared between the two ICs. For instance, IC1 and IC2 can have two separate antennas or they can share one antenna.

According to one embodiment, two different functions (i.e., those functions associated with each of IC1 and IC2) be implemented using common processing hardware with the each functionality being provided by the execution of respective and different pieces of software on the processing hardware.

Based upon the above discussion and illustrations, those skilled in the art will readily recognize that various modifications and changes may be made without strictly following the exemplary embodiments and applications illustrated and described herein. For example, the enable/disable alternating can have variable settings (e.g., IC1 can be active for 2 responses and then IC2 can be active for 3 responses). Such modifications do not depart from the true spirit and scope of the present disclosure, including that set forth in the following claims.

What is claimed is:

1. A contactless transponder device comprising:
a first integrated circuit (IC) that includes a first contactless transponder interface circuit configured and arranged to respond to a contactless field by providing a first identifier of the first IC using near-field wireless communications;
a second IC that includes a second contactless transponder circuit configured and arranged to respond to the contactless field by providing a second identifier of the second IC using near-field wireless communications; and
a controller circuit, communicatively connected to the first and second IC, and configured and arranged to
determine, in response to a first received communication request, that a previous state of the first IC allowed the first IC to respond using near-field wireless communications;
in response to the determination, inhibit, the first IC from responding to the contactless field using near-field wireless communications; and
allow, in response to a second received communication request, the first IC to respond using near-field wireless communications,
wherein the controller circuit is further configured and arranged to, in response to at least one from a group consisting of a local power supply level and a failure of a nonvolatile memory:
select one of the first and second ICs using a default selection algorithm;
enable the selected one of the first and second ICs to respond using near-field wireless communications; and
prevent a non-selected one of the first and second ICs from responding using near-field wireless communications.

2. The device of claim 1, wherein the controller circuit includes logic circuitry within the first IC and allows the second IC to respond using near-field wireless communications while the first IC is inhibited from responding.

3. The device of claim 1, wherein the controller circuit includes logic circuitry on a third IC and wherein each IC is located on a separate substrate and corresponding chip.

4. The device of claim 1, wherein the first IC further includes logic circuitry for interfacing with a contactless reader of an automobile and the second IC includes logic circuitry for interfacing with a contactless reader of a credit card device.

5. The device of claim 1, wherein the controller circuit is configured and arranged to alternate between a first state in which the first IC is inhibited from responding and a second state in which the first IC is allowed to respond, the alternating between the first and second states including switching between the first and second states in response to every received communication request.

6. The device of claim 1, wherein the device includes a user-selectable switch and the controller circuit is configured and arranged to respond to activation of the user-selectable switch by inhibiting the first IC from responding to the contactless field.

7. The device of claim 1, wherein the controller circuit is configured and arranged to inhibit the first IC from responding to the contactless field in response to a randomly generated number.

8. The device of claim 1, wherein the first contactless transponder circuit and the second contactless transponder circuit are each configured to communicate using a ISO14443 communication standard.

9. The device of claim 1, further including
a local power supply;
a volatile memory storage device; and
a nonvolatile memory storage device;
wherein the controller circuit is configured and arranged to
determine whether the local power supply is depleted;
select between volatile memory or the nonvolatile memory in response to the determination;
store information about a previous inhibit state of first IC; and
determine whether to subsequently inhibit the first IC based upon the stored information.

10. A method of operating an automotive key device comprising:
receiving a control input;
inhibiting, in response to the control input, a first integrated circuit (IC) that includes a first contactless communication interface circuit, from responding to a contactless field using near-field wireless communications; and subsequently allowing, in response to a change in the control input, both the first IC and a second IC to respond to the contactless field by providing respective identifiers, wherein, in response to the control input and at least one from a group consisting of a local power supply level and a failure of a nonvolatile memory, one of the first and second ICs is selected using a default selection algorithm;

the selected one of the first and second ICs is enabled to respond using near-field wireless communications; and a non-selected one of the first and second ICs is prevented from responding using near-field wireless communications.

11. The method of claim 10, further including the step of allowing, in response to the control input and while the first IC is inhibited, a second IC that includes a second contactless communication interface circuit to respond to the contactless field by providing an identifier of the second IC using near-field wireless communications.

12. The method of claim 10, further including the steps of storing information indicating whether or not the first IC was previously inhibited and changing the control input in response to the stored information.

13. The method of claim 10, wherein the control input is responsive to one or more of a stored volatile memory value, a stored nonvolatile memory value, a user switch and a random number.

14. The method of claim 10, further including the step of storing, in the first IC, automotive preferences for a user; and in the second IC, store payment information for the user.

15. The method of claim 10, further including the step of generating the control input based upon a tiered response to a stored volatile memory value, a stored nonvolatile memory value and a user switch.

16. The method of claim 10, further including the step of detecting one or more of a low battery condition and a nonvolatile memory failure.

17. A contactless transponder device comprising:

first and second integrated circuits (ICs), each IC including a respective contactless transponder interface circuit configured and arranged to respond to a contactless field by providing a respective identifier using near-field wireless communications; and a controller configured and arranged to, in response to a first received communication request:

using a value that is stored in a nonvolatile memory and that is indicative of a previous state of the device, determine whether the first IC was used to respond to a previous communication request;

in response to determining the first IC was used to respond to the previous communication request, enable the second IC to respond using near-field wireless communications and prevent the first IC from responding using near-field wireless communications; and in response to determining the first IC was not used to respond to the previous communication request, enable the first IC to respond using near-field wireless communications and prevent the second IC from responding using near-field wireless communications;

wherein the controller is further configured and arranged to, in response to at least one from a group consisting of a local power supply level and a failure of the nonvolatile memory:

select one of the first and second ICs using a default selection algorithm;

enable the selected one of the first and second ICs to respond using near-field wireless communications; and prevent a non-selected one of the first and second ICs from responding using near-field wireless communications.

18. The device of claim 17, wherein the controller is further configured and arranged to, in response to determining that the first received communication request originated from a contactless reader, enable both first and second integrated circuits to respond using near-field wireless communications.

* * * * *